(12) United States Patent
Piccazzo (10) Patent No.: US 8,473,954 B2
(45) Date of Patent: Jun. 25, 2013

(54) EXECUTING OPERATIONS VIA ASYNCHRONOUS PROGRAMMING MODEL

(75) Inventor: Michele Piccazzo, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 258 days.

(21) Appl. No.: 13/082,516

(22) Filed: Apr. 8, 2011

(65) Prior Publication Data

US 2011/0252425 A1 Oct. 13, 2011

(30) Foreign Application Priority Data

Apr. 8, 2010 (EP) ..................... 10159306

(51) Int. Cl.
*G06F 9/46* (2006.01)

(52) U.S. Cl.
USPC .......................... 718/101; 718/108

(58) Field of Classification Search
None
See application file for complete search history.

(56) References Cited

U.S. PATENT DOCUMENTS

| 5,602,524 | A | | 2/1997 | Mock et al. | |
|---|---|---|---|---|---|
| 6,026,424 | A | * | 2/2000 | Circenis | 718/104 |
| 6,122,758 | A | * | 9/2000 | Johnson et al. | 714/47.2 |
| 7,870,560 | B2 | * | 1/2011 | Fong et al. | 719/313 |
| 2010/0325635 | A1 | * | 12/2010 | Pree et al. | 718/103 |

OTHER PUBLICATIONS

Others, "System.IO.Stream Class".
Others, "Index of/software/dotgnu/pnetlib-doc/System/IO".
Richter, Dave, "The C# Asynchronous Programming Model", Jul. 27, 2009, URL:c-sharpcorner.com/UploadFile/logisimo/107252009003250AM/1.aspx.
Sullivan, William, "The Power of the Asynchronous Programming Model as Implemented by Delegates", Jun. 21, 2006, URL:codeproject.com/KB/dotnet/Async_Ops_and_Delegates.aspx.
Others, "Advanced Inheritance and Virtual Methods", Nov. 16, 2007, Handout 07, URL:stanford.edu/class/cs1071/handouts/07-Virtual-Functions.pdf.

* cited by examiner

*Primary Examiner* — Camquy Truong
(74) *Attorney, Agent, or Firm* — Laurence A. Greenberg; Werner H. Stemer; Ralph E. Locher (57) ABSTRACT

A method and a system execute operations, called jobs, via an APM model, in a MES system. The job execution is requested in an application defining an abstract Job class. The abstract Job class includes: an abstract method for job execution, called Execute, wherein a set of jobs to be executed is implemented, at engineering time, within the Execute method, when implementing a set of classes derived from the abstract Job class; a method for executing the job in asynchronous mode, called ExecuteAsync, the ExecuteAsync method runs the Execute method by following APM rules; and a method for executing the job in synchronous mode, called WaitForExecution, the WaitForExecution method runs the ExecuteAsync method waiting for its completion. At run time, by the application, requests the job execution in asynchronous mode by invoking directly the ExecuteAsync method or in synchronous mode by invoking the WaitForExecution method.

6 Claims, 5 Drawing Sheets

EXECUTING OPERATIONS VIA ASYNCHRONOUS PROGRAMMING MODEL

CROSS-REFERENCE TO RELATED APPLICATION

This application claims the priority, under 35 U.S.C. §119, of European application EP 10159306, filed Apr. 8, 2010; the prior application is herewith incorporated by reference in its entirety.

BACKGROUND OF THE INVENTION

Field of the invention

The present invention relates to a method and to a system for executing operations via asynchronous programming model.

In the world of industrial automation of today, manufacturing companies, in order to improve their production capabilities and their competitiveness, make use of IT infrastructure for industrial control and automation.

Software products for industrial automation have increased, with time, in scope and refinement, in order to fit the large variety of requirements of manufacturing companies.

As defined by the Manufacturing Enterprise Solutions Association (MESA International), a manufacturing execution system (MES) "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, Siemens Corporation offers a broad range of MES products, under its SIMATIC® product family.

In manufacturing plants, a variety of configurations enable the implementation of flexible machine concepts which require in the backbone rather complicated and sophisticated software solutions in order to enable the approach of integrated automation.

In developing complex software architectures where high performance are required, it is usually necessary to execute time consuming software operations and define accordingly a strategy for reaching and maintaining the often demanding required performances.

Examples of operations to be executed may include a sequence of statements such containing an access request to a database which may be time consuming. As used herein, the technical term "jobs" refers to such operations to be executed.

One of the known used strategies for speeding up the job execution is the execution in parallel mode integrated with the operating system (OS) hosting the application.

Thus, state of the art techniques use multithreaded architectures where a job is executed in a thread. With this approach, it is possible to execute a plurality of jobs in parallel within the same application.

The most known way to implement multithreaded applications is to have a pool of threads waiting for the job to be executed. For example, a generic thread—whose main task is to execute a job—is implemented and the execution state is tracked; a scheduler of threads—whose main activity is to coordinate a pool of threads—is implemented and a job per each of the threads is assigned and executed.

The pool of threads solution may be used in an application which gets to the controller the job to execute and which waits for the result of the job or the notification of its execution.

Depending on the desired behavior of the application, the pool of threads can be implemented using dynamic lists or array lists. The behavior can be defined as the logic that the scheduler applies in order to assign and execute jobs, e.g. in the scheduler, it is possible to limit the maximum number of concurrent threads or execute the job having maximum priority.

As known in the art and as explained in technical publications such as "Win32 Multithreaded Programming", Cohen-Woodring, O'Reilly 1998 and "Concurrent Programming On Windows", Duffy, Addison Wesley 2008, there are several architectures that may be applied in multithreaded programming.

However, all know architectures share two main problems which are the complexity and the integration with the OS hosting the application.

As regards the problem of complexity, when requirements of the scheduler and jobs increase, the required number of lines of code increases accordingly together with its complexity. And as the complexity increases, the maintenance of the application gets harder.

As regards the problem of integration with the OS hosting the application, it is very important to have a clear understanding of the main impact of the scheduler on other programs and vice versa in order to optimize the integration process, due to the fact that operating systems have rules governing the behavior of a program when several programs are running at the same time.

Moreover, when software engineers have to implement applications which require time consuming software operations, they have to solve the "race condition" problem, i.e. the conflict of resources. In fact, the hardware has its own limited resources, e.g. one personal computer is provided with a given number of hard disks and CPUs and it may occur that the same file must be accessed from different jobs.

Another drawback of multithread architectures is that it is not always true that a plurality of jobs can be executed at the same time in multithreaded architectures. In fact, some sorts of jobs cannot be executed in parallel mode, for example when two jobs have to read from or write to the same file.

Moreover, it is desirable to find a solution for speeding the execution of operations which is reusable in a plurality of applications and of different sorts.

Some evident benefits for solving the above mentioned problems are provided by a programming approach based on Asynchronous Programming Model (APM) provided in the Microsoft .NET Framework. Such approach improves the functionality of jobs executed in parallel mode.

In fact, the APM model defines a pattern for programming asynchronous operations, it allows concurrent execution of asynchronous operations and it is natively integrated with the Windows operating system.

However an approach of job execution based on the APM model has still some drawbacks.

A first drawback is that jobs that cannot be run in serialized mode do not take advantage of the APM model benefits.

A second drawback is that an "a priori" decision whether jobs are to be executed in serialized or parallel mode provides a lack of flexibility.

A third drawback is that with the APM model approach there is no notification of events such as status changes of a job, except for the event of completed execution.

SUMMARY OF THE INVENTION

It is accordingly an object of the invention to provide executing operations via an asynchronous programming model which overcome the above-mentioned disadvantages of the prior art methods and devices of this general type.

The aforementioned aim is achieved by a process and a system for executing operations, hereinafter called jobs, via Asynchronous Programming Model, herein after called APM, in a MES system, wherein job execution is requested in an application. The process defines an abstract Job class, for defining and implementing the behavior of a generic job with its methods and properties. The abstract job class contains the following: an abstract method for job execution, hereinafter called Execute, a set of jobs to be executed is implemented, at engineering time, within the Execute method, when implementing a set of classes derived from the abstract Job class; a method for executing the job in asynchronous mode, hereinafter called ExecuteAsync, the ExecuteAsync method runs the Execute method by following APM rules; and a method for executing the job in synchronous mode, hereinafter called WaitForExecution, the WaitForExecution method runs the ExecuteAsync method waiting for its completion. At run time, the application, requests the job execution in asynchronous mode by invoking directly the ExecuteAsync method or in synchronous mode by invoking the WaitForExecution method.

In embodiments of the invention, at run time, when invoking the job execution in an asynchronous mode or in synchronous mode, a parameter specifying an execution timeout may be advantageously provided.

In embodiments of the invention, at run time, when invoking the job execution, a parameter specifying an execution status may be conveniently provided.

In embodiments of the invention, the parameter specifying the execution status may preferably acquire a value selected from the group consisting of: Undefined, WaitingExecution, Started, CanContinueExecution, Cancelled, Failed, NotExecuted, Timeout and Completed.

In embodiments of the invention, the application may advantageously be a client application requesting the job execution to a server.

Furthermore, a computer program element can be provided, containing computer program code for performing steps according to the above mentioned method when loaded in a digital processor of a computing device.

Additionally, a computer program product stored on a computer usable medium can be provided, containing computer readable program code for causing a computing device to perform the mentioned method.

Embodiments of the invention allow parallelizing the execution of time consuming jobs without the implementation of complicated software architectures.

Embodiments of the invention are integrated with the OS hosting the application due to the fact that are implemented via APM rules.

Embodiments of the invention execute jobs optimizing the resources of the OS. In fact, the execution of long-time consuming statements is optimized depending on the effective load of the OS hosting the application.

With embodiments of the proposed invention, through the abstract class Job, the implementation of complex jobs is simplified so that programming is easier. In fact, the software engineer does not need to write threads—which are small programs—but only use the class Job. The software engineer has to implement only one method, the Execute method, with the code of the job. A higher level abstraction of a job is defined allowing the software engineers to easily and fast implement new jobs.

With embodiments of the invention, the API for job execution may be applied and reused in different applications without need for recoding it.

Embodiments of the invention are fully integrated with the Microsoft .NET Framework because they are implemented using its features.

With embodiments of the invention, it is proposed to let the software engineer to decide the mode of execution of a job when it is to be executed, so that the same job may advantageously be executed both in serialized and in parallel mode depending on the requirements of the run-time scenario.

With embodiments of the invention, events may be notified to the requesting application during the job execution.

Other features which are considered as characteristic for the invention are set forth in the appended claims.

Although the invention is illustrated and described herein as embodied in executing operations via an asynchronous programming model, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

According to the invention, in a MES system, the execution of one or more jobs is requested in an application. An abstract Job class is defined for defining and implementing the behavior of a generic job with its methods and properties. The Job class, among others, contains three methods: the abstract Execute method, the ExecuteAsync method and the WaitForExecution method.

The Execute method is implemented at engineering time in a derived class of the Job class and it contains a set of operations to be executed. For example, it may contain one or more of the following statements: connection to database and queries, connection to remote web service, access to a file and other.

The ExecuteAsync method runs the Execute method in asynchronous mode by following APM rules. In this manner, the asynchronous job execution exploits optimally all the advantages of the APM rules as the optimization of the system hardware resources.

The WaitForExecution method executes the job in synchronous mode by running the ExecuteAsync method while waiting for its completion.

At run time, the job execution may be invoked, within the application, either in asynchronous mode, by invoking directly the ExecuteAsync method, or in synchronous mode by invoking the WaitForExecution method.

In embodiments of the invention, the skilled in the art easily understands that a client/server architecture may be provided wherein the requesting application may be a client application invoking the job execution in a server.

Advantageously, while invoking the job execution it is also possible to provide a parameter specifying a timeout for the Job execution. In such a way, each job may conveniently be executed in the four following different modes:
in synchronous mode, where the application is locked until the execution of the job is completed;
in synchronous mode with timeout, where the application is locked until the execution of the Job is completed or the period of time for which the Job is allowed to run has been reached;
in asynchronous mode, where the application starts the execution of the Job but it is not stopped and it can continue the execution of new Jobs; and
in asynchronous mode with timeout, the execution of the Job has a maximum period of time; when the application starts the execution, it is not locked and, in case of timeout, it stops and cancels the Job.

Figure 1:
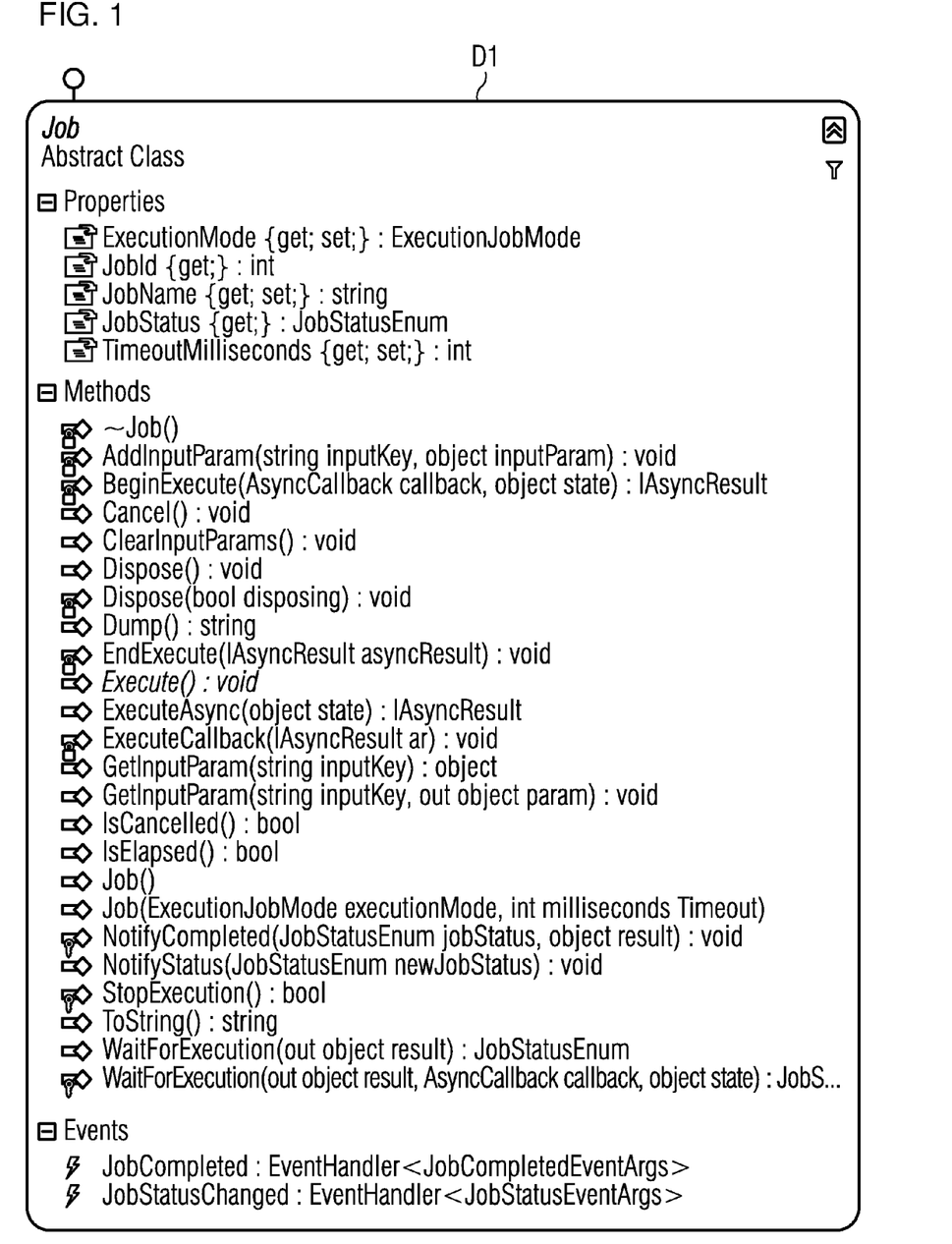
FIG. 1 is a diagrammatic illustration showing a one class diagram of a Job class.
Figure 2:
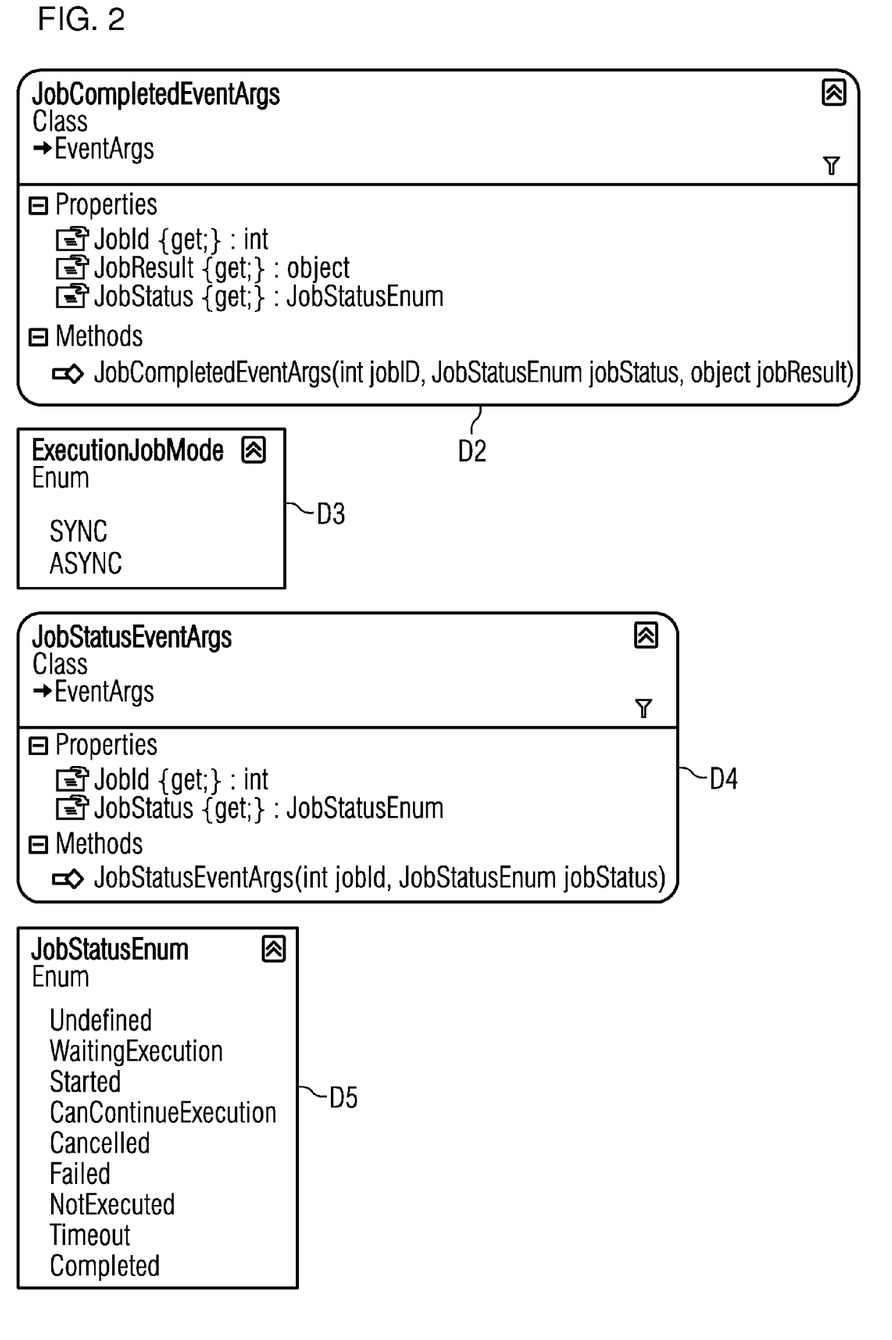
FIG. 2 is a diagrammatic illustration showing four additional class diagrams of the Job class.

The API for job execution, which applies the APM rules, defines the classes, the properties, the methods and the enumeration values shown in the class diagrams D1, D2, D3, D4, D5 of FIG. 1 and of FIG. 2.

In the class diagram D1 of FIG. 1, containing the Job class of the API for job execution, it is presented the abstract class Job, defining and implementing the behavior of a generic Job with its methods and properties. The other classes defined in class diagrams D2 and D3 are used by the abstract class Job class in its methods and properties.

In the class diagrams D3, containing Enumeration values of ExecutionJobMode used by the Job class, it is presented the enumeration value ExecutionJobMode, defining the mode of execution, which can be synchronous or asynchronous.

In the class diagram D2, containing JobCompletedEventArgs class used by the Job class, it is presented the class JobCompletedEventArgs, the parameter of the event notifying the end of execution of the Job.

In the class diagram D4, containing JobStatusEventArgs used by the Job class, it is presented the class JobStatusEventArgs, the parameter of the event notifying the status change of the Job.

In the class diagram D5, containing Enumeration values of JobStatusEnum used by the Job class, it is presented the enumeration value of JobStatusEnum, containing the values that the status of a Job can assume. For example, it can have only one of the following values: Undefined, WaitingExecution, Started, CanContinueExecution, Cancelled, Failed, NotExecuted, Timeout, and Completed.

The property ExecutionJobMode defines whether the Job is executed in synchronous or asynchronous mode, acquiring the following two values: ExecutionJobMode.SYNC or ExecutionJobMode.ASYNC. The property TimeoutMilliseconds contains the maximum period of time assigned to the execution of the mode. In case TimeoutMilliseconds is not defined, it is not considered during the execution, as if its value were infinite.

Thus, by combining the two properties ExecutionJobMode and TimeoutMilliseconds, it is possible to conveniently define the four above mentioned execution modes for the abstract class Job.

The main methods of the Job class are the public abstract method Execute, the two public methods ExecuteAsync and WaitForExecution. The Execute method is defined and implemented in all the classes that need the feature of job execution. Hence, the method Execute is called in both synchronous and asynchronous modes. The ExecuteAsync is called in order to execute the job in asynchronous mode and the WaitForExecution method is called in order to execute the job in synchronous mode. The WaitForExecution method runs the ExecuteAsync method and it waits for its completion.

The application programming interface (API) for job execution, being a binary dynamic linked library (DLL) may be registered in the Global Assembly Cache (GAC) to be shared from different .NET applications. Thus, thank to its registration in the GAC, the API for job execution is accessible by several applications and it may be advantageously reused during the development of new software.

Figure 3:
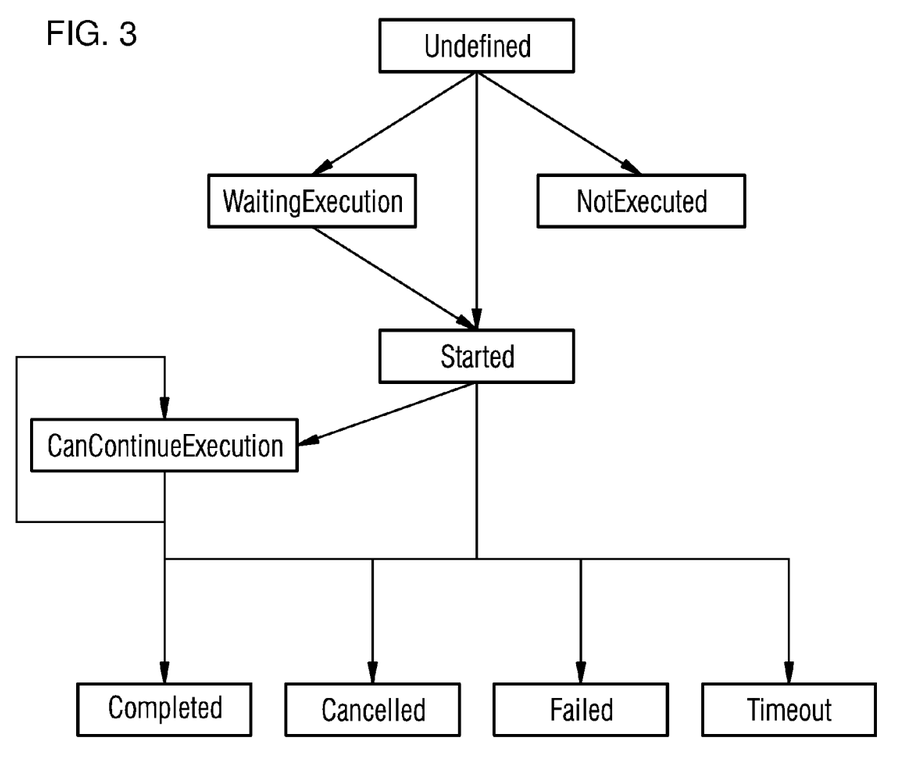
FIG. 3 is a block diagram schematically illustrating an exemplary state machine of a job, in accordance with an example embodiment of the invention.

FIG. 3 is a block diagram schematically illustrating an exemplary state machine of a job, in accordance with an example embodiment of the present invention FIG. 3 shows possible states that a job may acquire and their sequence. This may be an example of event-based model for the notification of the execution of a job, e.g. execution completed with success or failure. All intermediate states (WaitingExecution, Started, CanContinueExecution) are notified with the event JobStatusChanged. The final states (Completed, Cancelled, Failed, Timeout and NotExecute) are notified with the event JobCompleted. Moreover, by using the methods AddInputParam and GetInputParam of the Job class, it is conveniently possible to store and retrieve additional key-values useful during the execution.

Figure 4:
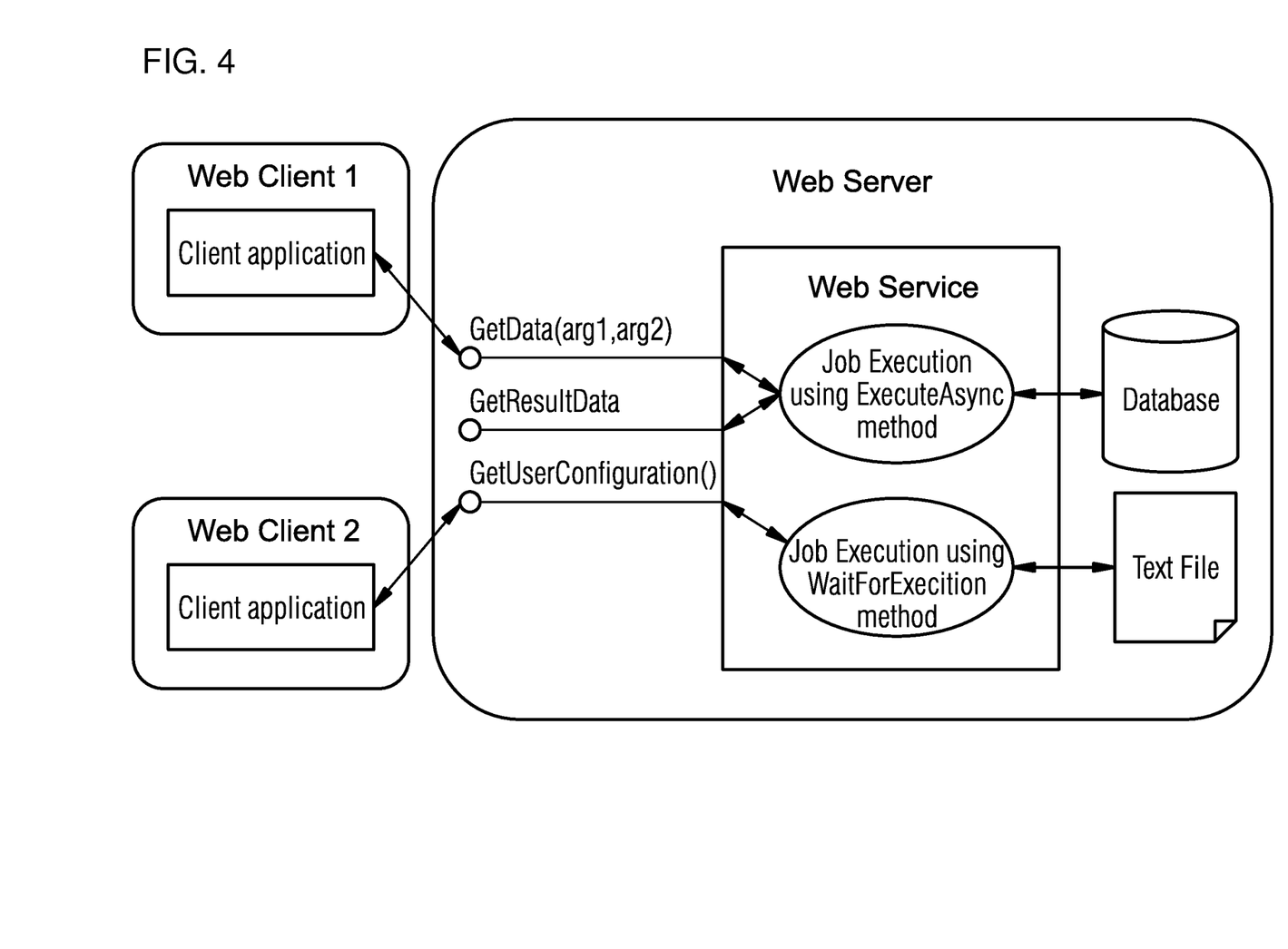
FIG. 4 is a block diagram schematically illustrating an exemplary scenario in a Web application, in accordance with an example embodiment of the invention.

FIG. 4 is a block diagram schematically illustrating an exemplary scenario in a web application, in accordance with an example embodiment of the present invention.

Figure 5:
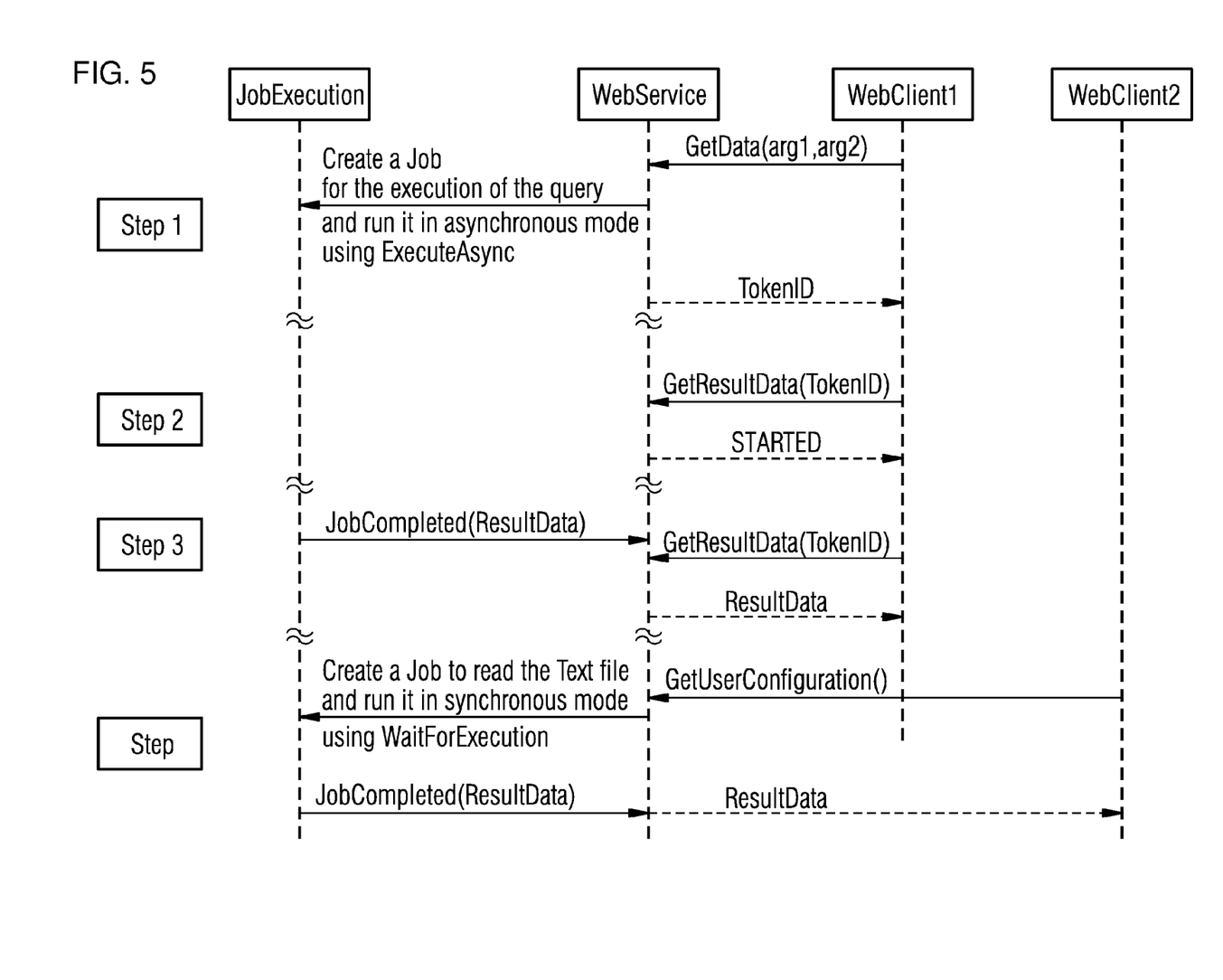
FIG. 5 is a sequence diagram which schematically illustrates an exemplary sequence diagram for a job execution in a web application, in accordance with an example embodiment of the present invention.

FIG. 5 is a sequence diagram schematically illustrating an exemplary sequence diagram for a job execution in a web application, in accordance with an example embodiment of the present invention.

As shown in FIGS. 4 and 5, embodiments of the proposed invention may be used in a web application where web clients, i.e. applications hosted in browsers, may invoke jobs, which may be time consuming, on a web server.

The API for job execution is used on the web server in a web service, for example the web service may execute queries to a database or may execute accesses to a file. The web service can be invoked through web methods. Until a web method it is not terminated with the response to the client, the web method is not able to accept other requests. For example, let us assume that there is a first web method for searching a postal code via a database query and a second web method for accessing a configuration file, both web methods exposed in the same web service.

The first web method accepts as input the country, the town and the address and by executing a database query searches the required postal code. Let us assume that the database query is long due to the fact that the address database contains millions of data. If the time consuming database query were a synchronous call the web service would not be able to answer to any other web client and the request in web client would be "frozen", unable to get any input from mouse or keyboard.

With asynchronous job execution, as shown in STEP 1 of FIG. 5, the web method stores the request parameters and creates a job dedicated to the query execution on the database and returns to the web client a request identifier, called TokenID and then it executes the job in asynchronous mode.

Using the asynchronous execution of jobs on the web Server for the execution of queries on database, the web server is advantageously able to return a quick response to the web client, since the parameter storage and the job creation is performed quickly. The first answer is an identifier of the request, the second is the result coming from the database upon a notification of job completion as shown in STEP 3.

As the web server returns a first response, it is thus conveniently able to accept new requests from other clients.

Moreover, the user interface of the web clients is unplugged from the web server because it receives an immediate response from it. Thus, while the web client requires the result of the job execution (using the token identifier), it is able to accept new input as mouse click. In this way, the web Client is not frozen while it is waiting for the result from the web server.

As shown in FIG. 5, a sequence diagram of the execution of jobs exposed via the web service is illustrated.

An example of time consuming job may be a GetData web method with several of input parameter. According to embodiments of the proposed invention, when the web client invokes GetData, it receives a token that identifies the execution on the web server. As the server receives the call, it creates an instance of a class derived from the Job class dedicated to the long execution. After the job instance creation, the web service gives back the tokenID, identifier of the job and call, to the web client and it starts the execution of the job in asynchronous mode. In turn, the web client uses the token identifier with a polling model until it retrieves the result.

In the STEP 1, the client invokes the web method and retrieves the token identifier TokenID. In the STEP 2, the client application calls the GetResultData using the TokenID in order to get back the result. The web service method gets back the result containing the status of the Job execution. As depicted in FIG. 3, the status can be one of the JobStatusEnum values. STEP 2 can be repeated more times by using a polling model until the execution status is COMPLETED in STEP 3. During the execution, the Web Client can process other input data because it is not frozen and the operating system optimizes the management of resources as the database, hard disks and network connection.

In the exemplary scenario of FIGS. 4 and 5, two clients are connected to the same web server.

The second client may request user data via an access to a configuration file. The access to a file is a job to be executed in synchronous mode so that the file, in the meanwhile, is not accessed by any other web client. When accessing to the configuration file, the web service is able to respond only to one synchronous request until completion of the request. Even if the request is executed in a synchrounous mode via the WaitForExecution method on the created job, the fact that the WaitForExecution method is in turn invoking the ExecuteAsync method is optimally exploiting the hardware resources in an easy to implement manner from the point of view of the software engineer who has only to implement the Execute method and invoke the WaitForExecution method.

In other embodiments of the present invention, the skilled in the art easily understands that several synchronous requests may be executed in parallel in a scenario where there are several files to be accessed and there are several web methods for accessing the files.

In embodiments of the proposed invention, the applications are implemented with Microsoft .NET Framework 2.0 or later versions.

In addition to the embodiments of the present invention described above, the skilled persons in the art will be able to arrive at a variety of other arrangements and steps which, if not explicitly described in this document, nevertheless fall within the scope of the appended claims.

The invention claimed is:

1. A process for executing operations called jobs, via an asynchronous programming model (APM), in a manufacturing execution system (MES), wherein a job execution is requested in an application, which comprises the steps of:
   a) defining an abstract Job class, for defining and implementing a behavior of a generic job with its methods and properties, the abstract job class including:
      i) an abstract method for job execution called Execute method, wherein a set of jobs to be executed is implemented, at engineering time, within the Execute method, when implementing a set of classes derived from the abstract Job class;
      ii) a method for executing the job in asynchronous mode called ExecuteAsync method, wherein the ExecuteAsync method runs the Execute method by following APM rules;
      iii) a method for executing the job in synchronous mode called WaitForExecution method, wherein the WaitForExecution method runs the ExecuteAsync method waiting for its completion; and
   b) at run time, by the application, requesting the job execution in asynchronous mode by invoking directly the ExecuteAsync method or in synchronous mode by invoking the WaitForExecution method,
   when invoking the job execution in the asynchronous mode or in the synchronous mode, a parameter specifying an execution timeout is provided.

2. The process according to claim 1, wherein, in step b), when invoking the job execution, a parameter specifying an execution status is provided.

3. The process according to claim 2, wherein the parameter specifying the execution status acquires a value selected from the group consisting of:
   Undefined,
   Waiting Execution,
   Started,
   CanContinueExecution,
   Cancelled,
   Failed,
   NotExecuted,
   Timeout, and
   Completed.

4. The process according to claim 1, wherein the application is a client application requesting the job execution to a server.

5. The process according to claim 1, which further implementing the process via software.

6. A system, comprising:
   a processor having means for executing operations called jobs, via an asynchronous programming model (APM), in a manufacturing execution system (MES), wherein a job execution is requested in an application, said means performing the steps of:
   a) defining an abstract Job class, for defining and implementing a behavior of a generic job with its methods and properties, the abstract Job class including:
      i) an abstract method for job execution called Execute method, wherein a set of jobs to be executed is implemented, at engineering time, within the Execute method, when implementing a set of classes derived from the abstract Job class;
ii) a method for executing the job in an asynchronous mode called ExecuteAsync method, wherein the ExecuteAsync method runs the Execute method by following APM rules;
iii) a method for executing the job in a synchronous mode called WaitForExecution method, wherein the WaitForExecution method runs the ExecuteAsync method waiting for its completion; and b) at run time, by the application, requesting the job execution in the asynchronous mode by invoking directly the ExecuteAsync method or in the synchronous mode by invoking the WaitForExecution method, when invoking the job execution in the asynchronous mode or in the synchronous mode, a parameter specifying an execution timeout is provided.

* * * * *